United States Patent
Gupta et al.

(10) Patent No.: US 10,331,537 B2
(45) Date of Patent: Jun. 25, 2019

(54) WATERFALL COUNTERS AND AN APPLICATION TO ARCHITECTURAL VULNERABILITY FACTOR ESTIMATION

(71) Applicant: Advanced Micro Devices, Inc., Sunnyvale, CA (US)

(72) Inventors: Manish Gupta, San Diego, CA (US); Vilas Sridharan, Boxborough, MA (US); David A. Roberts, Boxborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 157 days.

(21) Appl. No.: 15/389,573

(22) Filed: Dec. 23, 2016

(65) Prior Publication Data

US 2018/0181492 A1 Jun. 28, 2018

(51) Int. Cl.
*G06F 11/00* (2006.01)
*G06F 11/34* (2006.01)
*G06F 12/0891* (2016.01)

(52) U.S. Cl.
CPC .......... *G06F 11/34* (2013.01); *G06F 12/0891* (2013.01); *G06F 2212/60* (2013.01)

(58) Field of Classification Search
CPC .... G06F 11/073; G06F 11/34; G06F 11/3037; G06F 12/00–12/16
See application file for complete search history.

(56) References Cited

U.S. PATENT DOCUMENTS

| | | | |
|---|---|---|---|
| 9,135,160 B1* | 9/2015 | Zheng | G06F 12/0246 |
| 2012/0159502 A1* | 6/2012 | Levin | G06F 9/5016 718/104 |
| 2013/0290649 A1* | 10/2013 | Jorgensen | H03K 21/38 711/154 |
| 2014/0237191 A1* | 8/2014 | Dong | G06F 12/0891 711/135 |
| 2017/0083455 A1* | 3/2017 | Rogers | G06F 12/121 |

* cited by examiner

*Primary Examiner* — Michael Maskulinski
(74) *Attorney, Agent, or Firm* — Volpe and Koenig, P.C.

(57) ABSTRACT

Described herein are waterfall counters and an application to architectural vulnerability factor (AVF) estimation. Waterfall counters count events that are generated at event generation logic. The waterfall counters are a combination of small, fast counters local to the event generation logic, and larger, global counters in fast memory. The local counters can be saturation or oscillation counters. When a local counter is saturated or evicted, the value from the local counter is added to the global counter. This addition can be done using logic local to the local or global counter. The waterfall counters provide a full-accuracy event count without the high bandwidth that is needed to maintain the global counters. An AVF estimation can be determined based on ratios from counts of read events, write events, and total events using the waterfall counters.

20 Claims, 10 Drawing Sheets

WATERFALL COUNTERS AND AN APPLICATION TO ARCHITECTURAL VULNERABILITY FACTOR ESTIMATION

GOVERNMENT RIGHTS CLAUSE

This invention was made with Government support under Prime Contract Number DE-AC02-05CH11231, Fixed Price Subcontract Number 7216338 awarded by the Department of Energy. The Government has certain rights in this invention.

BACKGROUND

Counters implemented in hardware have limitations on the number of bits to keep the storage overhead in check. However, a lower number of bits can lead to a loss in accuracy for values that change rapidly during program execution. This can have an effect on application or program execution or performance.

BRIEF DESCRIPTION OF THE DRAWINGS

A more detailed understanding may be had from the following description, given by way of example in conjunction with the accompanying drawings wherein.

DETAILED DESCRIPTION

Described herein are waterfall counters, methods for using waterfall counters and an application of waterfall counters to architectural vulnerability factor (AVF) estimation. The waterfall counters count a number of events that are generated at event generation logic, for example, a processor. The waterfall counters are a combination of small, fast local counters in hardware (i.e., static random access memory (SRAM) cache or array and local to, for example, the processor) and larger, global counters in fast memory (e.g., off-chip memory or non-volatile memory). The local counters can be saturation counters, oscillation counters, or other applicable counters. When a local counter is saturated or evicted, the value from the local counter is added to a global counter in the fast memory. In an implementation, this addition is efficiently done using logic local to the local or global counter. The waterfall counters provide a full-accuracy event count without the high bandwidth that is normally needed to maintain large counter arrays (i.e., the global counters) in off-chip memory.

In an implementation, the waterfall counters count the number of read and write events for a particular structure. An architectural vulnerability factor (AVF) estimator determines or provides an AVF estimation for the structure based on ratios determined from the number of read events, number of write events and the total number of events. The waterfall counters and AVF estimator provide a hardware-based runtime AVF estimator for memory systems (i.e., an online memory AVF estimator).

Figure 1:
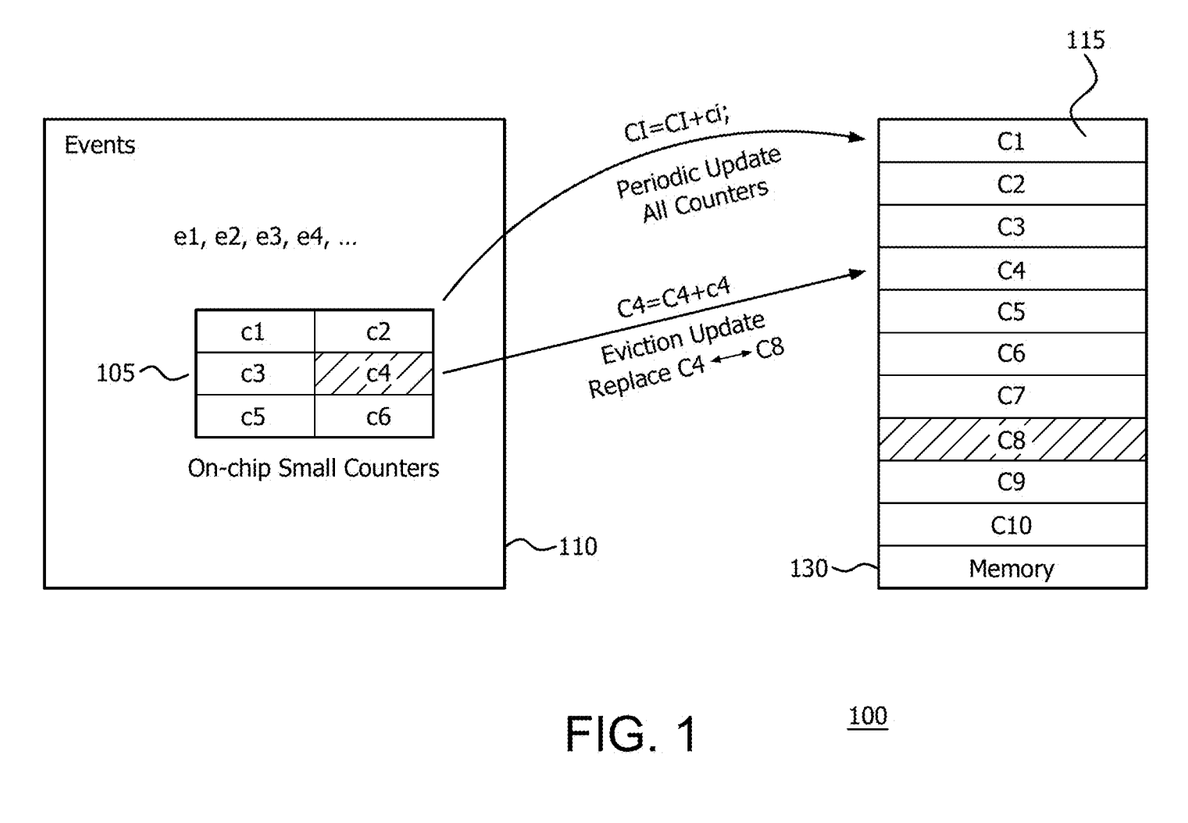
FIG. 1 is a diagram of waterfall counters in accordance with certain implementations.

FIG. 1 illustrates waterfall counters 100 in accordance with certain implementations. Waterfall counters 100 include local counters 105 that are small and maintained local to event generation logic 110 (e.g., local to a processor/system-on-a-chip and implemented in an on-chip SRAM array or cache) and global counters 115 that are large and implemented in larger, slower off-chip memory 130. In an illustrative example, local counters 105 are six on-chip small counters c1-c6 and global counters 115 are ten full counters C1-C10. The size of local counters 105 and global counters 115 and the rate of update of the counters are intertwined. For example, if a local counter has an x bit counter and a global counter has a y bit counter and x is less than y, then x and y can be selected to optimize an update frequency between the local counter and the global counter. In an implementation, a local counter is a 4 bit counter and its associated global counter is a 64-bit counter. In this example, global counters 115 are full counters. This means that all bits in the 64-bit counter are being used and that every counter in the table is being used. For example, in FIG. 1 there are only six on-chip small counters c1-c6 but there are ten off-chip large counters C1-C10. The table for the small counters c1-c6 is not "full" as compared to the table for the large counters C1-C10. Consequently, the term small counter refers to counters that use fewer bits per counter and where the table or structure associated with the small counters hold less than the total number of large counters.

In an implementation, global counters 115 are located separately from the data. In an implementation, global counters 115 are located with the data or intertwined with the data. This simplifies knowing where global counters 115 are located. In an example, accessing the data also pulls the global counter information (i.e., memory location of the global counter 115).

Event generation logic 110 generates events e1, e2, e3, e4 etc on a periodic or event-driven basis. These events contain the information that the user is interested in recording, such as the number of reads and writes per page for determining AVF estimation as described below. The events are initially counted or stored in the local counters 105. The values stored in local counters 105 are added (and/or subtracted if using signed integers) to values stored in global counters 115 when local counters 105 are evicted due to capacity or otherwise (e.g., when a local counter 105 reaches or exceeds its maximum value). In an implementation, this addition is efficiently done using logic local to local counters 105 or global counters 115. Local counters 105 are then be reset to their initial values after any update. In an implementation, global counters 115 are updated with the values in local counters 105 on a periodic basis. This provides higher accuracy or greater precision of the event count at global counters 115. At any instant, the values in global counters 115 are used to determine a metric, relationship, characteristic, feature or similar parameter (hereinafter "metric") associated with the event or information.

In an implementation, addition or subtraction logic is a command supported by the memory that can use an integer operand that is smaller than the target data value (noting that in conventional commands the integer operand and the target data value are normally the same).

In an illustrative eviction scenario, the total number of local counters needed would nominally be too large to fit on-chip and a subset of the total number of local counters would actually be on-chip at a given time. Consequently, the on-chip local counters will encounter evictions. On eviction, the corresponding global counter is updated in the memory. One such eviction is illustrated in FIG. 1, where local small counter c4 is evicted to create space for local small counter c8. As shown, the global counter C4 is updated with the values from local small counter c4. The addition is carried out by logic local to the memory 130 or event generation logic 110.

Figure 2:
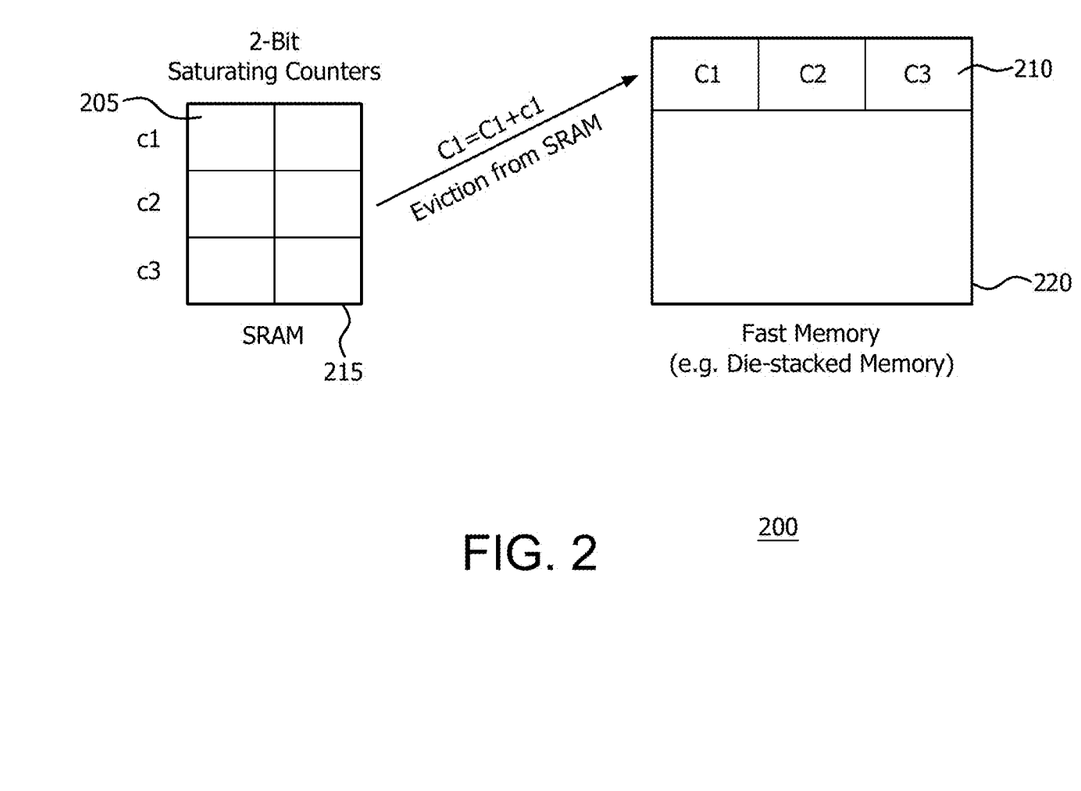
FIG. 2 is another diagram of waterfall counters in accordance with certain implementations.

FIG. 2 is a block diagram of waterfall counters 200 in accordance with certain implementations. In an implementation, waterfall counters 200 include local counters 205 and global counters 210, where local counters 205 are saturating counters. In particular, each of the saturating counters are two or more bit counters. The additional bits are used to increase count accuracy or precision. In an implementation, global counters 210 are located in off-chip memory. In an implementation, global counters 210 are located separately from the data. In an implementation, global counters 210 are located with the data or intertwined with the data. This simplifies knowing where global counters 210 are located. In an example, accessing the data also pulls the global counter information (i.e., memory location of the global counter 210).

As illustrated in FIG. 2, local counters 205 are implemented in a compact SRAM unit 215 that holds a small number of bits (i.e., three 2-bit saturating counters c1, c2, and c3) and global counters 210 are implemented in a memory 220 (i.e., C1, C2, and C3). SRAM cells can be used to enable fast access. In an implementation, memory 220 is fast memory such as a die-stacked memory. Every time a local counter 205 is allocated in SRAM unit 215, local counter 205 starts counting from zero until it saturates. The next update, after local counter 205 has saturated, results in an update to corresponding global counter 210, and resets local counter 205 to zero. In an implementation, SRAM unit 215 have a subset of full, global counters 210, further limiting the number of required bits for on-chip SRAM unit 215. SRAM unit 215 and memory 220 are accessed in parallel and updates to global counters 210 are made on eviction of local counters 205. In an implementation, global counters 210 are updated with the values in local counters 205 on a periodic basis.

Operationally, local counters 205 count the number of events (for example at event generation logic 110) until local counter 205 saturates and global counters 210 are then updated. In an implementation, global counters 210 are updated periodically. At any instant, a sum of the values at global counters 210 provide a metric related to the events.

In an implementation, local counters 205 are oscillating counters. For example, local counters are 4-bit oscillating counters which vary from +7 to −8. The local counters start with a value with zero. Different event types result in incrementing and decrementing the 4-bit oscillating counters, respectively. The local counters and global counters are configured as waterfall counters and the rules for eviction and updates are as described above.

Figure 3:
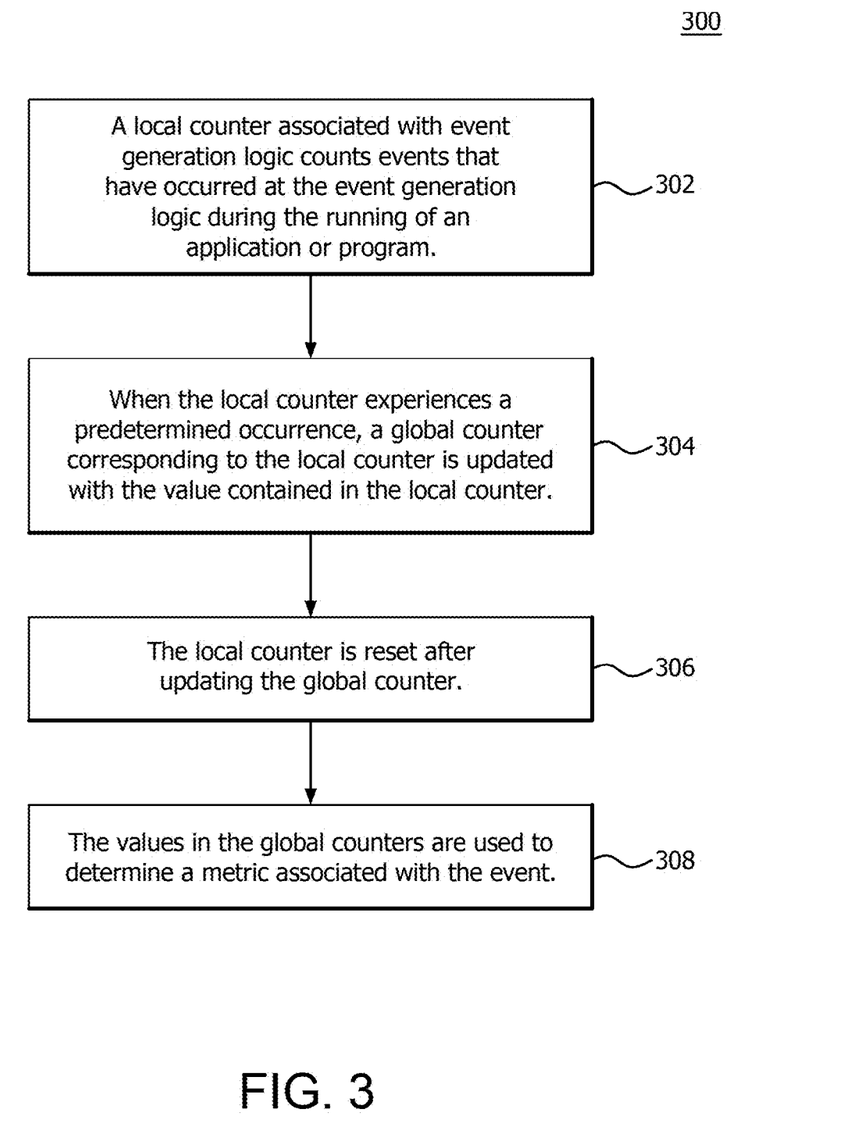
FIG. 3 is an example flow diagram of a method for using waterfall counters in accordance with certain implementations.

FIG. 3 is an example flow diagram of a method 300 for using waterfall counters in accordance with certain implementations. In general, method 300 is applicable to local counters and global counters arranged in a waterfall counter architecture as described herein. A local counter associated with event generation logic counts events that have occurred at the event generation logic during the running of an application or program (step 302). The event can be a read event or a write event, for example. When the local counter experiences a predetermined occurrence, a global counter corresponding to the local counter is updated with the value contained in the local counter (step 304). In an implementation, the updating is addition or subtraction of the values in the local counter to the existing values in the global counter. Other updating techniques or methods can be used. The predetermined occurrence can be saturation of the local counter, a periodic update, eviction of the local counter or similar occurrences that require updating of the global counter. The local counter is reset after updating the global counter (step 306). The values in the global counters are used to determine, provide, establish or form the basis of a metric associated with the event (step 308).

In an application, the waterfall counters are used in architectural vulnerability factor (AVF) estimation. Single-event upsets from particle strikes are a key challenge in microprocessor design. Single event upsets arise from energetic particles which generate electron-hole pairs as they pass through a semiconductor device. This results in state inversion of a logic device (e.g., a latch, SRAM cell, or gate) and introduces a logical fault into the logic device's operation. This type of fault is called a soft or transient error as it is not a permanent error of the logic device. A soft error rate for a structure (e.g., an instruction queue, load queue, buffer and other similar microarchitectural structures) is the product of its raw error rate, as determined by process and circuit technology, and the AVF. A structure's AVF is defined as the probability that a fault in that particular structure will result in a visible incorrect execution or visible error. That is, the AVF is a metric used to determine the vulnerability of a digital processing system. The AVF calculation is an expensive operation with respect to computation time and storage space required to track the vulnerability of every memory bit.

The soft error rate (SER) for a structure (e.g., an instruction queue, load queue, buffer and other similar microarchitectural structures) is the product of its raw error rate, as determined by process and circuit technology, and the AVF. The SER can be determined for a bit, cache line or a page in memory. The SER of an architectural structure is defined by a summation of the SER of each of its sub-structures (SERi), as given by Equation 1:

$$SER_i = FIT_i \times AVF_i \qquad \text{Equation 1}$$

In Equation (1), the Failure in Time (FIT) rate is determined by neutron or alpha particle flux and properties of the structure or circuit. The second term in the equation is AVF, which is the probability that a fault in a structure i will result in a visible incorrect execution.

Figure 4A:
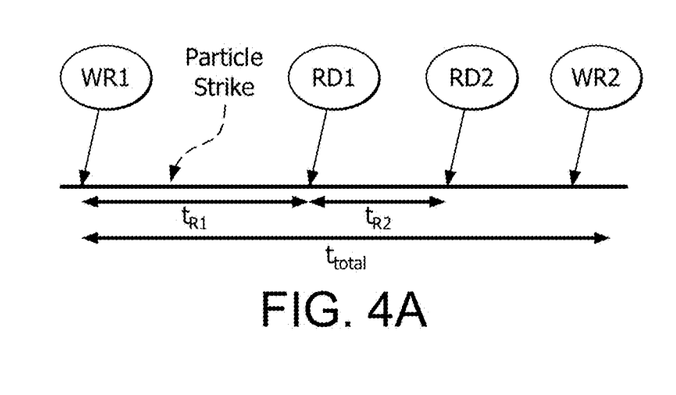
FIGS. 4A-4D are diagrams illustrative of single event upsets with respect to read and write events in accordance with certain implementations.

The AVF of a bit in memory is the fraction of time the bit is in an Architecturally Correct Execution (ACE) state. In an ACE state, a change to the bit's value will result in an incorrect execution. FIGS. 4A-4D illustrate four pages in memory, where a bit in memory is being written and read four times during program execution. In each case, after a bit is written for the first time, WR1, it's in the ACE state until it's read at RD1. Any transient error (particle strike) in between WR1 and RD1 may result in incorrect execution. For example, with reference to FIG. 4A, the AVF of the bit goes up by a fraction of (tR1/t_total). The bit is read again at RD2, which then adds (t_R2/t_total) to the AVF calculation. The bit is non-ACE state from RD2 to WR2. The AVF of this bit in memory for the entire execution can be given by Equation 2:

$$AVFi = (tR1 + tR2)/t\_total \quad \text{Equation 2}$$

Figure 4B:
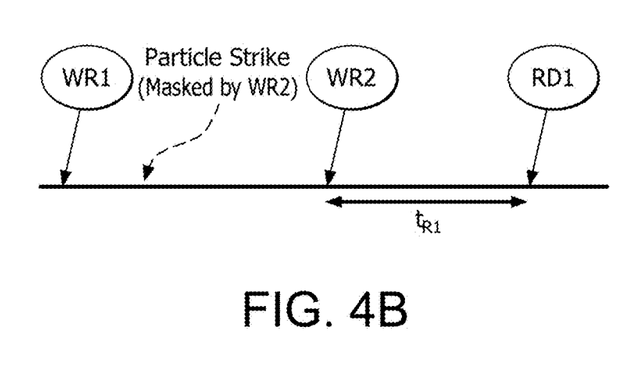

FIG. 4B shows a bit undergoing a particle strike in between two consecutive writes, WR1 and WR2. Hence, the bit in the FIG. 4B is in a non-ACE state in between WR1 and WR2. However, the particle strike in between WR1 and WR2 will be masked since the correct value for RD1 will be over-written by WR2.

Figure 4C:
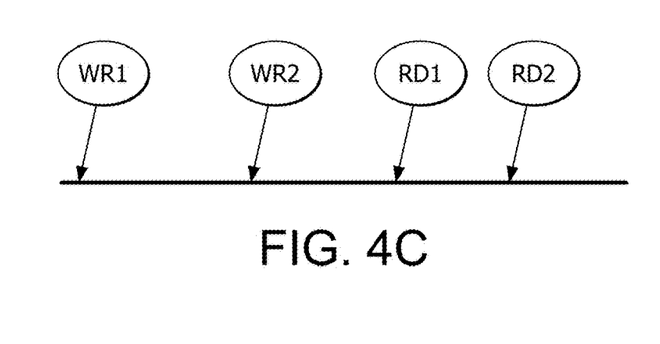
Figure 4D:
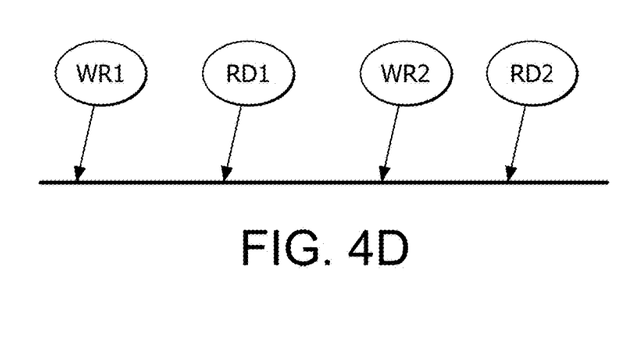

FIGS. 4C and 4D illustrate that two bits with the same number of read events and write events may have very different AVFs. This makes a difference, for example, with respect to a page placement policy. As described herein, the AVF analysis on memory is done at a cache line granularity because memories are usually written and read at the cache line granularity. The AVF of individual cache lines is summed to compose the AVF of a page. A page placement policy that solely takes into account page hotness (i.e., how frequently a page is accessed) will place the page of FIG. 4C and the page of FIG. 4D onto off-chip or 3D die-stacked memory with equal likelihood. In contrast, a page placement policy based on AVFs will place the pages differently. That is, AVFs are used to place a page in different memory types, where each memory type can have different characteristics such as reliability, speed, stability and other similar parameters.

The exact AVF calculation at runtime has both performance and storage overhead. In particular, actual AVF calculation in hardware is hard, because it is impractical to count every cycle in between reads and writes for every individual memory location. However, the number of reads and writes can provide a close approximation of a bit's AVF value. As stated above, the AVF of a bit is the fraction of time a bit remains vulnerable for the entire execution and the AVF of an architectural structure is the summation of all AVFs of all the bits. A vulnerable time period of a bit is defined by the number of cycles the bit remains idle before the bit is read. Once the bit is written it's considered refreshed and free from any soft errors that may have occurred before that write. A bit that's being read more is more vulnerable than a bit that's being written.

Figure 5A:
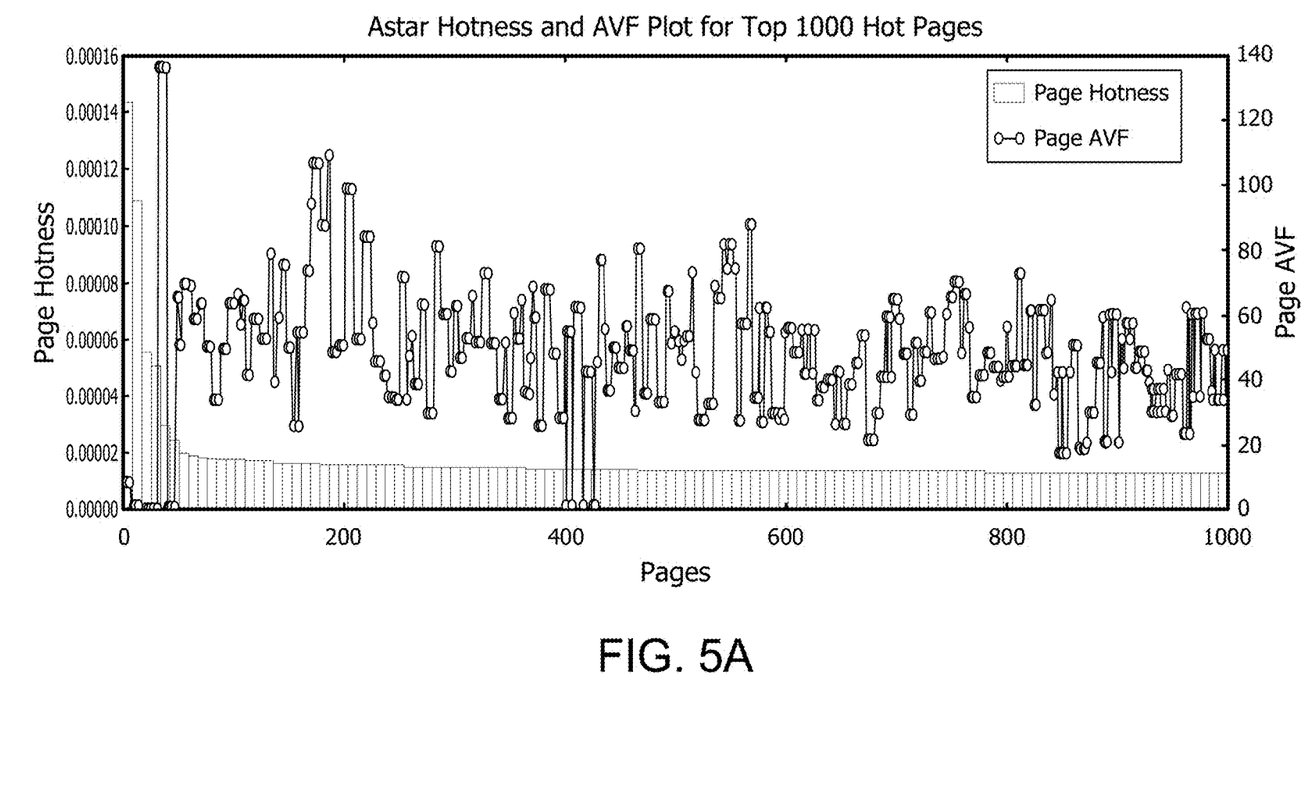
FIGS. 5A and 5B are charts illustrative of page architectural vulnerability factor and page hotness along with read events and write events in accordance with certain implementations.
Figure 5B:
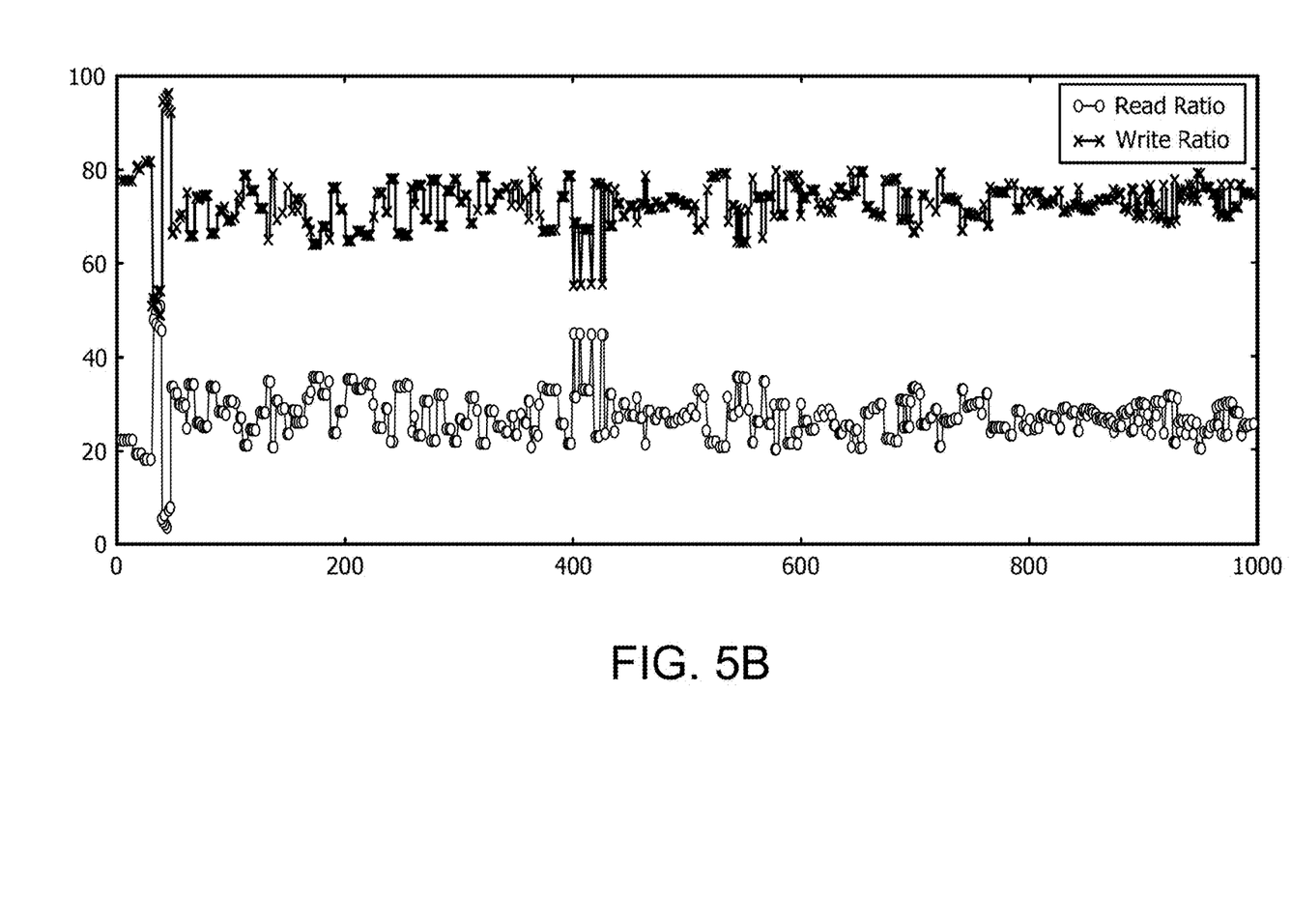

FIGS. 5A and 5B illustrate the correlation between the number of reads and writes and AVF estimation. FIG. 5A shows the AVF of the top 1000 hot pages, where "hot" or "hotness" refers to the number of accesses that are occurring on a page (e.g., the number of read and write events). FIG. 5B shows: 1) write ratios, which are the number of write events/the number of read plus write events for a page; 2) read ratios, which are the number of read events/the number of read plus write events for a page; and indirectly shows 3) read-to-write ratios. A comparison of the two graphs shows a strong correlation between each of the ratios of FIG. 5B with the page AVF values of FIG. 5A.

Figure 6:
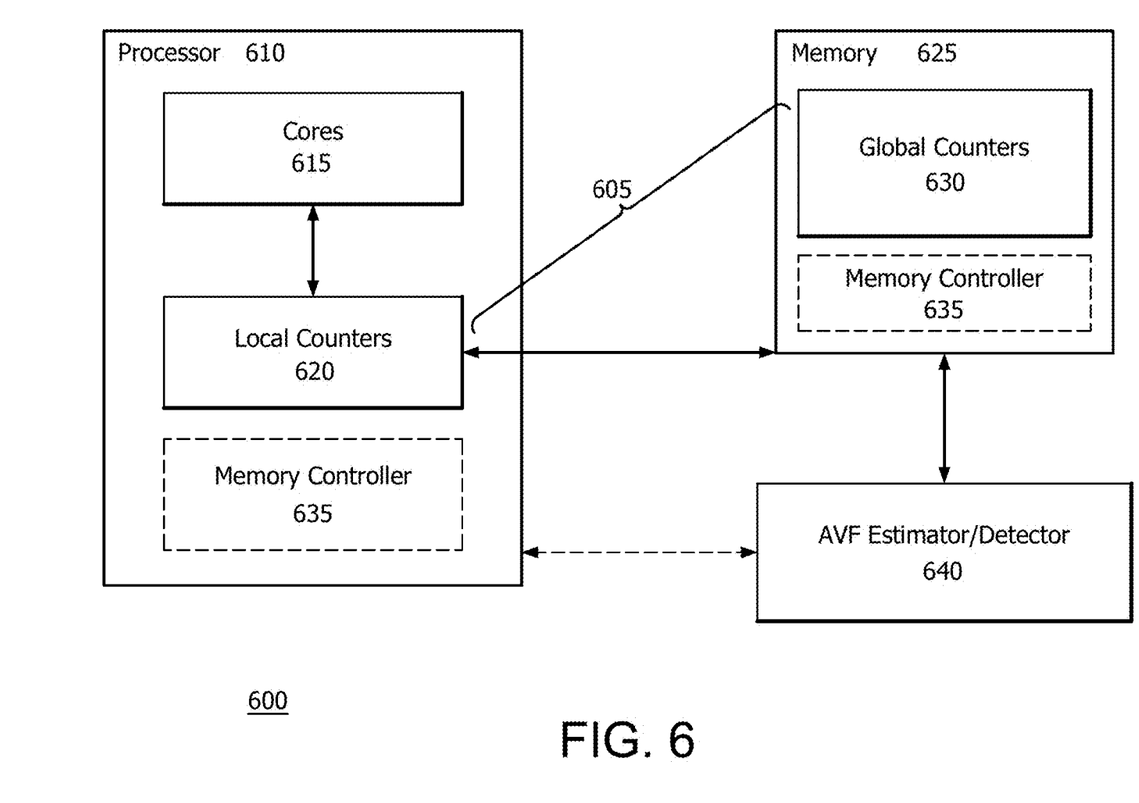
FIG. 6 is a block diagram of a system using waterfall counters for architectural vulnerability factor estimation in accordance with certain implementations.

FIG. 6 is a block diagram of a system 600 using waterfall counters 605 for AVF estimation in accordance with certain implementations. In particular, system 600 records the number of read and write events using waterfall counters 605 and determines or provides an AVF estimate based on at least one of read ratios, write ratios and read-to-write ratios.

System 600 includes waterfall counters 605 and a processor 610 which includes one or more cores 615. Waterfall counters 605 include one or more local counters 620 that are local to processor 610 and are coupled or connected (collectively "coupled") to one or more cores 615. Waterfall counters 605 also include one or more global counters 630 that are implemented in a memory 625. One or more global counters 630 are coupled to one or more local counters 620. In addition to locale differences, one or more local counters 620 are smaller in size than one or more global counters 630. The difference in sizes between one or more local counters 620 and one or more global counters 630 determines the rate of eviction and updates to one or more global counters 620. If a local counter size is too small, the system will trigger frequent updates to a global counter.

One or more local counters 620 and one or more global counters 630 collectively maintain the number of read and write events that are generated by one or more cores 615. A memory controller 635 is implemented at either the processor 610 or at memory 625 to combine and update the number of read and write events at one or more global counters 630 with the number of read and write events from one or more local counters 620. An AVF estimator or detector 640 (referred to as an "estimator" herein) that is coupled to global counters 630, uses the number of read and write events to determine AVF estimations based on the read ratios, write ratios or read-to-write ratios. As described in greater detail below, the AVF estimations are used for offline application analysis and online reliability control. In an implementation, AVF estimator 640 can be software, hardware or a combination thereof on processor 610, which reads one or more global counters 630 on a periodic basis to make adjustments on page placement. In an implementation, AVF estimator 640 disables and then re-enables waterfall counters 605 when AVF estimator 640 performs memory accesses during maintenance operations (e.g., page migration operations), to avoid interfering with the counting operations.

Referring back to FIG. 1, AVF estimation is implemented using waterfall counters 100. In this instance, event generation logic 110 is a processor and events e1, e2, e3, e4 etc are the number of reads and writes per page for determining the AVF estimation. The events are initially counted or stored in local counters 105. The values stored in local counters 105 are added to values stored in global counters 115 on a periodic basis or when local counters 105 are evicted due to capacity or otherwise. Local counters 105 are reset to their initial values after any update.

As described herein, AVF analysis on memory is done at a cache line granularity because memories are usually written and read at the cache line granularity. In an implementation, the AVF of individual cache lines is summed to compose the AVF of a page. This can be useful in the instance where the memory management software or logic tracks and migrates larger (i.e., page) sized blocks of data, that are composed of multiple cache-line sized blocks. In an implementation, local counters 105 are implemented by a SRAM-based memory array which holds a single bit (or counter) for every cache line. In an implementation, a bit is cleared in the event of a write to a cache line and a bit is set in the event of a read from a cache line. This provides an estimation for high AVF pages. In an implementation, a bit is set in the event of a write to a cache line and a bit is cleared in the event of a read from a cache line. This provides an estimation for low AVF pages. The AVF estimation for a memory section is determined by summing up all global counters 115 associated with all the cache lines in the memory section. In an implementation, the single-bit SRAM-based memory array is reset periodically.

In the implementations described herein, flags are used to determine which cache lines or addresses (hereinafter referred to as "cache lines"), were read from in the last interval. This can be done on a periodic basis. This type of information provides an estimate of the vulnerability time or exposure for a cache line (i.e., time between the last write and read). The exposure is based on the time difference between when a write occurs in a memory unit and when a read occurs that reads the written value. If the time difference between a write and a read that reads that written value is long, then a fault that occurs in the memory is more likely to affect execution state and cause improper execution than if the time difference between a write and a read that reads that written value is short.

In the implementations described herein, a valid bit is used to indicate whether a write operation has been seen at all for a given cache line as opposed to cache lines which are simply unused by the program.

Referring back to FIG. 2, AVF estimation is implemented using waterfall counters 200. In this instance, local counters 205 are saturating counters which use two or more bits per cache line to increase the accuracy of the AVF estimation. Different sets of local counters 205 are used for write events and read events for each cache line. Operationally, local counter 205 counts the number of read events until local counter 205 saturates or a cache line encounters a write operation. In the event of a write operation, local counters 205 associated with the cache line are reset to zero. In this implementation, global counters 210 are updated at a write event, at saturation, at eviction or at all such events. At any instant, a sum of the values at global counters 210 for all the cache lines in a page is approximately proportional to AVF of the page. Pages with high AVF should reside in memory with higher reliability, where higher reliability could lower failure rates or better error correction schemes.

As described herein above, local counters 205 are implemented in a compact SRAM unit 215 that holds a small number of bits, (i.e., three 2-bit saturating counters c1, c2, and c3), and global counters 210 are implemented in a memory 220 (C1, C2, and C3). Table 1 shows the overhead of storing 1-bit and 2-bit counters per cache line for a memory size of 1 GB and 16 GB, respectively. For a 16 GB memory and 64 B cache line, the memory overhead is 64 MB.

TABLE 1

| Memory Size (GB) | Number of bytes | Number of cache lines (64 B cache line) | Number of 4 KB pages | 1-bit per line overhead (MB) | 2-bit per line overhead (MB) |
|---|---|---|---|---|---|
| 1 | 1073741824 | 16777216 | 262144 | 2 | 4 |
| 16 | 17179869184 | 268435456 | 4194304 | 32 | 64 |

In an implementation, AVF estimation is implemented using local counters which are oscillating counters. For example, local counters are 4-bit oscillating counters which vary from +7 to −8. The local counters start with a value with zero for every page. Read and write events to a page result in incrementing and decrementing the 4-bit oscillating counters, respectively. For a page with a 50-50 read-to-write ratio, the value of the local counter will stay zero. The local counters and global counters are configured as waterfall counters and the rules for eviction and updates are as described above.

Figure 7A:
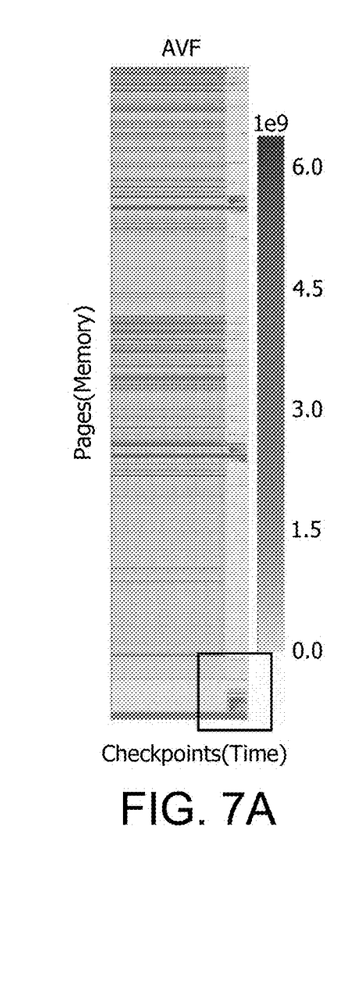
FIGS. 7A-7D are illustrative charts for offline analysis of architectural vulnerability factor in accordance with certain implementations.
Figure 7B:
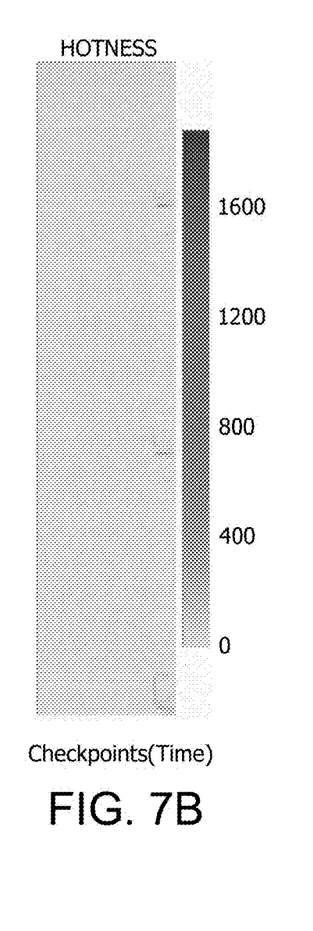
Figure 7C:
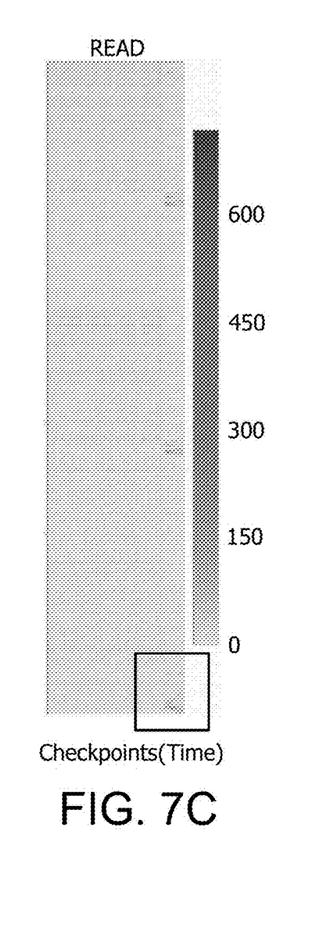
Figure 7D:
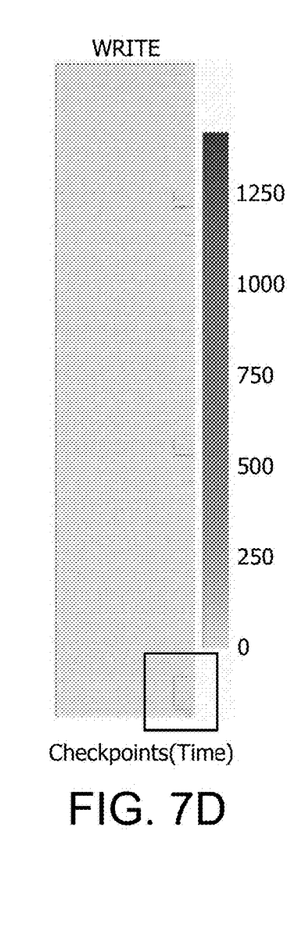

Referring back to FIG. 6, the AVF estimator 640 is used for offline application analysis and online reliability control using any of the waterfall counter implementations described herein. FIGS. 7A-7D show an offline AVF analysis of an application and are the heat maps for AVF, hotness (read+write), reads, and writes of pages in memory for different application checkpoints (intervals), respectively. Referring to FIG. 7A, the darker a band is across the interval, the higher the AVF value and the more vulnerable a page is across the interval. As shown, there is a spatial (across pages) and temporal (across checkpoints) variation in AVF. For example, a few memory pages at the bottom of FIG. 7A are not vulnerable for most of the interval until the very end of the application's execution. These particular pages become vulnerable for the last few intervals. The reason for their non-vulnerability in the beginning of the application is that these pages are written in the final few intervals before being read, (as shown in FIGS. 7C and 7D).

An offline analysis by AVF estimator 640 is used to reduce application or program vulnerability. In particular, two types of offline application analysis can be performed: 1) program changes; and 2) N-version AVF programming and choice of algorithm. In an implementation, a program is changed such that the data is written first before its being used. For the example in FIG. 7C, many pages are being only heavily read which attributes to their increase in vulnerability. With appropriate program level changes, the AVF values of these applications can be reduced for the subsequent runs. In an implementation, different algorithm/implementations of the same application might have different AVF values. AVF estimator 640 is used to find appropriate choices of algorithm for the system with a given failure budget (i.e., reliability requirement).

In an implementation, AVF estimator 640 is used for online reliability control. For example, AVF estimator 640 is used for data placement as described in an application entitled "PERFORMANCE-AWARE AND RELIABILITY-AWARE DATA PLACEMENT FOR N-LEVEL HETEROGENEOUS MEMORY SYSTEMS" having Ser. No. 15/331,270, the entire contents of which are incorporated by reference as if fully set forth herein. For example, with reference to FIGS. 7A-7D, AVF estimation in the interval (checkpoint) is used to make control decisions for the next interval. The control decision of heterogeneous memory architecture is the placement of the data among the available memory choices.

Figure 8:
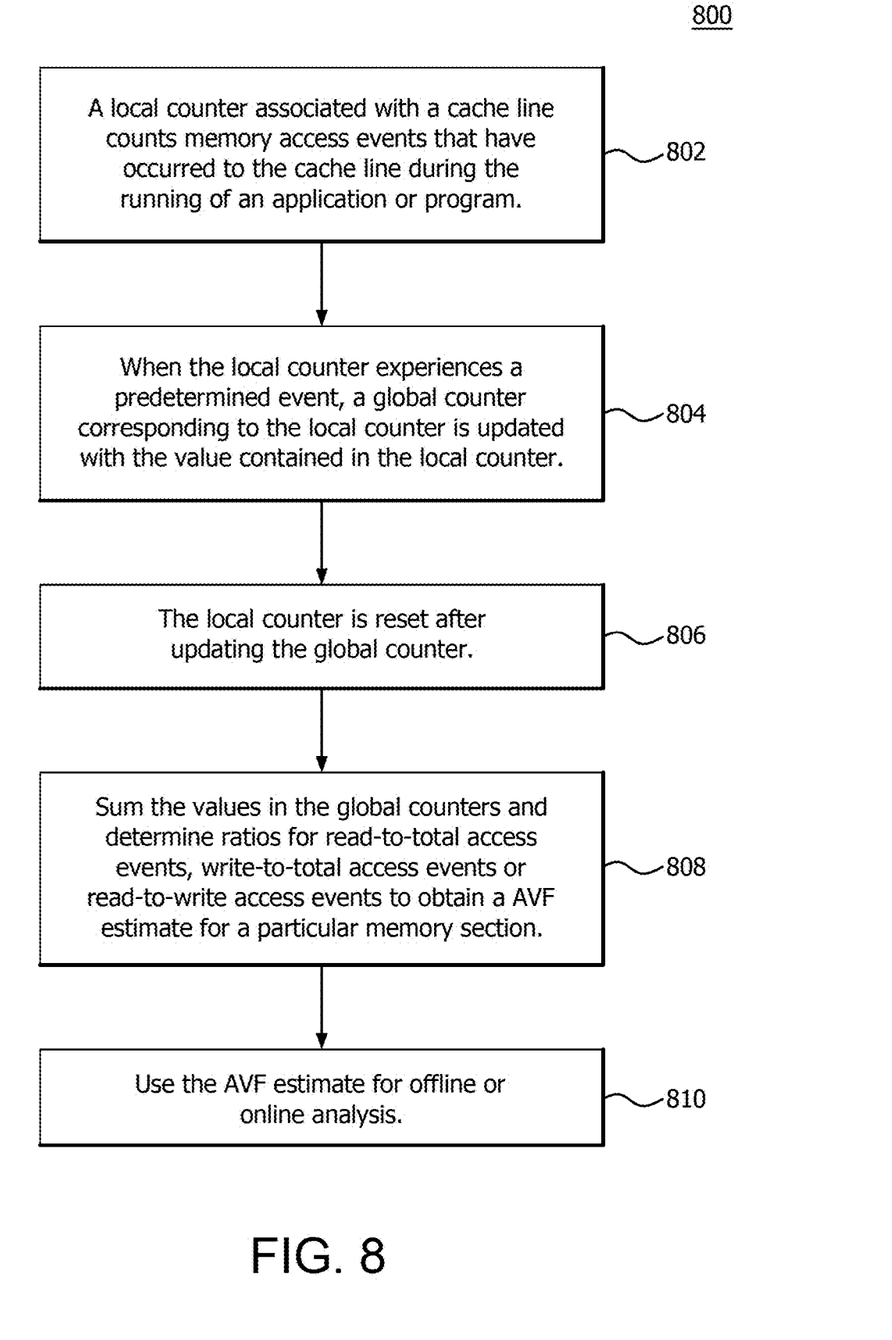
FIG. 8 is an example flow diagram of a method for using waterfall counters for architectural vulnerability factor estimation in accordance with certain implementations.

FIG. 8 is an example flow diagram 800 of a method for determining architectural vulnerability factor estimation using waterfall counters in accordance with certain implementations. A local counter associated with a cache line counts memory access events that have occurred to the cache line during the running of an application or program (step 802). The memory access event is a read event or a write event, for example. When the local counter experiences a predetermined occurrence, a global counter corresponding to the local counter is updated with the value contained in the local counter (step 804). In an implementation, the updating can be addition of the values in the local counter to the existing values in the global counter. Other updating techniques or methods can be used. The predetermined occurrence can be saturation of the local counter, a periodic update, eviction of the local counter or similar occurrences that require updating of the global counter. The local counter is reset after updating the global counter (step 806). The values in the global counters are summed and ratios for read-to-total access events, write-to-total access events or read-to-write access events, for example, are determined to obtain a AVF estimate for a particular memory section (step 808). For example, a particular memory section can be a page and each of the global counters associated with the cache lines in the page can be summed to determine the AVF estimate for the page. In an implementation, the AVF estimate is used for offline or online analysis as described herein (step 810).

Figure 9:
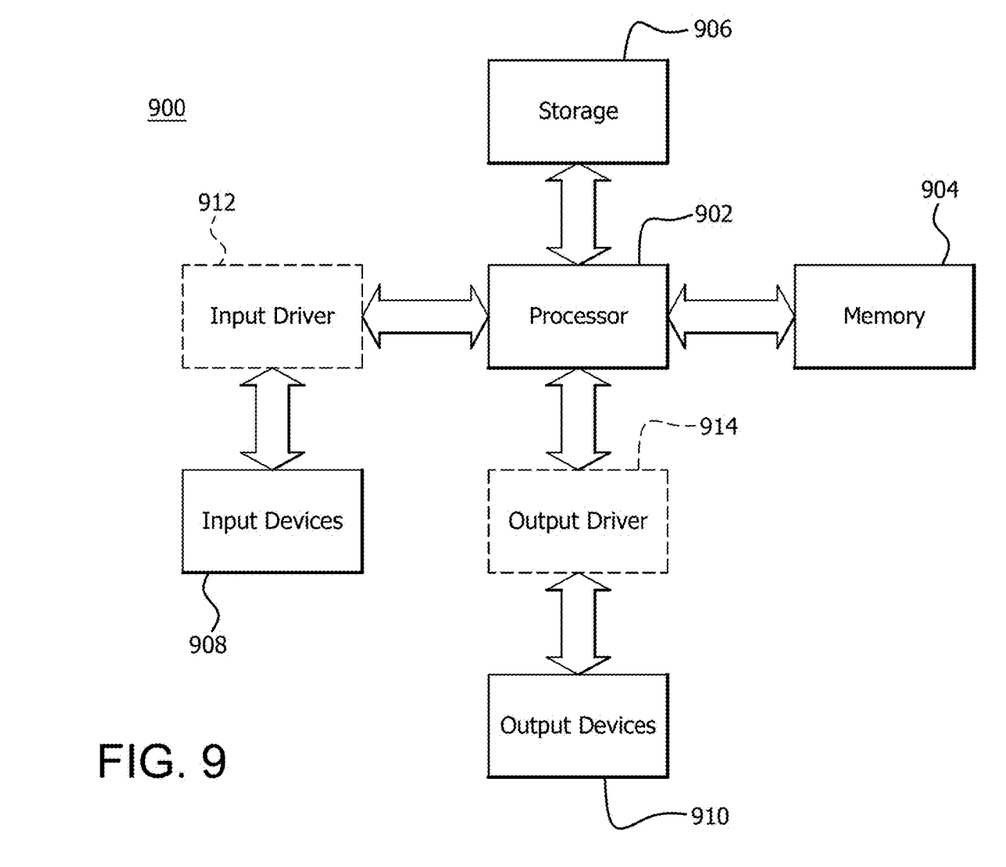
FIG. 9 is a block diagram of an example device in which one or more disclosed implementations may be implemented.

FIG. 9 is a block diagram of an example device 900 in which one or more portions of one or more disclosed embodiments may be implemented. The device 900 may include, for example, a head mounted device, a server, a computer, a gaming device, a handheld device, a set-top box, a television, a mobile phone, or a tablet computer. The device 900 includes a processor 902, a memory 904, a storage 906, one or more input devices 908, and one or more output devices 910. The device 900 may also optionally include an input driver 912 and an output driver 914. It is understood that the device 900 may include additional components not shown in FIG. 9.

The processor 902 may include a central processing unit (CPU), a graphics processing unit (GPU), a CPU and GPU located on the same die, or one or more processor cores, wherein each processor core may be a CPU or a GPU. The memory 904 may be located on the same die as the processor 902, or may be located separately from the processor 902. The memory 904 may include a volatile or non-volatile memory, for example, random access memory (RAM), dynamic RAM, or a cache.

The storage 906 may include a fixed or removable storage, for example, a hard disk drive, a solid state drive, an optical disk, or a flash drive. The input devices 908 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 910 may include a display, a speaker, a printer, a haptic feedback device, one or more lights, an antenna, or a network connection (e.g., a wireless local area network card for transmission and/or reception of wireless IEEE 802 signals).

The input driver 912 communicates with the processor 902 and the input devices 908, and permits the processor 902 to receive input from the input devices 908. The output driver 914 communicates with the processor 902 and the output devices 910, and permits the processor 902 to send output to the output devices 910. It is noted that the input driver 912 and the output driver 914 are optional components, and that the device 900 will operate in the same manner if the input driver 912 and the output driver 914 are not present.

In general, a method for architectural vulnerability factor estimation includes a local counter and global counter at each cache line that counts memory access events occurring at the cache line. The global counter for each cache line is updated with a value from the local counter when a predetermined occurrence occurs at the local counter. The values from each global counter that is associated with a cache line for a memory section is summed and memory access event ratios based on the summations are determined to obtain architectural vulnerability factor (AVF) estimation for the memory section. In an implementation, online or offline analysis is performed using the AVF estimation. In an implementation, the memory access events are read accesses and write accesses. In an implementation, the memory access event ratios are at least one of read-to-total access ratios, write-to-total access ratios and read-to-write access ratios. In an implementation, each local counter is on-chip and local to a processor and each global counter is off-chip. In an implementation, for each cache line, the local counter has an x bit counter and the global counter has a y bit counter, wherein x is less than y and x and y are selected to optimize update frequency between the local counter and the global counter. In an implementation, a number of local counters on-chip are less than a number of global counters. In an implementation, each local counter is a saturation counter or an oscillation counter. In an implementation, the predetermined occurrence is at least one of counter saturation, counter eviction and periodic update. In an implementation, the summing is done using logic local to the local counter or the global counter. In an implementation, for each cache line, the local counter is reset after updating the global counter. In an implementation, a time interval between a write event for a value and a read event reading the written value is determined to obtain a vulnerability time for the cache line.

In general, a system for determining architectural vulnerability factor estimation includes a local counter configured to count memory access events occurring at a cache line and a global counter in a waterfall connection with the local counter. The global counter is updated with a value from the local counter when a predetermined occurrence occurs at the local counter. The values from each global counter that is associated with a cache line in a memory section are summed by an architectural vulnerability factor (AVF) estimator and memory access event ratios based on the summations are determined to obtain architectural vulnerability factor (AVF) estimation for the memory section. In an implementation, the memory access events are read accesses and write accesses. In an implementation, the memory access event ratios are read-to-total access ratios, write-to-total access ratios and read-to-write access ratios. In an implementation, the local counter is on-chip and local to a processor and the global counter is off-chip. In an implementation, for each cache line, the local counter has an x bit counter and the global counter has a y bit counter, wherein x is less than y and x and y are selected to optimize update frequency between the local counter and the global counter. In an implementation, a number of local counters on-chip are less than a number of global counters. In an implementation, the local counter is a saturation counter or an oscillation counter. In an implementation, the predetermined occurrence is a counter saturation, counter eviction or periodic update.

In general, a method for metric determination includes a local counter counting events occurring at an event generator and a global counter that is updated with a value from the local counter when a predetermined occurrence occurs at the local counter. A metric(s) is then determined based on the value in the global counter regarding the events. In an implementation, the events are memory read accesses and memory write accesses which occur at a cache line associated with the local counter and the metric is a read-to-total access ratio, write-to-total access ratio or read-to-write access ratio. In an implementation, a local counter is on-chip and local to a processor and a global counter is off-chip. In an implementation, a number of local counters on-chip are less than a number of global counters. In an implementation, the local counter is reset after the global counter is updated.

In general, a system for determining a metric includes a local counter which counts events occurring at an event generator and a global counter in a waterfall connection with the local counter, where the global counter is updated with a value from the local counter when a predetermined occurrence occurs at the local counter. The system further includes a processor which determines a metric based on the value in the global counter regarding the events. In an implementation, the events are memory access read events and memory access write accesses and wherein the metric is a read-to-total access ratio, write-to-total access ratio and read-to-write access ratio. In an implementation, the local counter is on-chip and local to a processor and the global counter is off-chip. In an implementation, a number of local counters on-chip are less than a number of global counters.

In general and without limiting embodiments described herein, a computer readable non-transitory medium including instructions which when executed in a processing system cause the processing system to execute a method for using waterfall counters.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the implementations.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for memory storage based on an estimated architectural vulnerability factor, the method comprising:
counting memory access events occurring at cache lines, each cache line having a local counter and global counter;
for each cache line, updating the global counter with a value from the local counter when a predetermined occurrence occurs at the local counter;
summing values from each global counter that is associated with a cache line for a memory section;
determining memory access event ratios based on the summations;
determining an estimated architectural vulnerability factor (AVF) for the memory section based on the ratios, the estimated AVF proportional to a soft error rate of the memory section;
determining the soft error rate of the memory section based on the estimated AVF; and
storing information from the memory section in a type of memory based on the soft error rate.

2. The method of claim 1, further comprising:
performing at least one of online and offline analysis using the AVF estimation.

3. The method of claim 1, wherein the memory access events are read accesses and write accesses and the memory access event ratios are at least one of read-to-total access ratios, write-to-total access ratios, and read-to-write access ratios.

4. The method of claim 1, wherein each local counter is on-chip and local to a processor and each global counter is off-chip.

5. The method of claim 1, wherein:
for each cache line, the local counter has an x bit counter and the global counter has a y bit counter; and
x is less than y, and x and y are selected to optimize update frequency between the local counter and the global counter.

6. The method of claim 5, wherein a number of local counters on-chip are less than a number of global counters.

7. The method of claim 1, wherein the predetermined occurrence is at least one of counter saturation, counter eviction and periodic update.

8. The method of claim 1, wherein the summing is done using logic local to one of the local counter and the global counter.

9. The method of claim 1, further comprising:
for each cache line, resetting the local counter after updating the global counter.

10. The method of claim 1, further comprising:
determining a time interval between a write event for a value and a read event reading the written value to obtain a vulnerability time for the cache line.

11. A system for determining architectural vulnerability factor estimation, comprising:
a local counter configured to count memory access events occurring at a cache line;
a global counter in a waterfall connection with the local counter, wherein the global counter is configured to be updated with a value from the local counter when a predetermined occurrence occurs at the local counter;
an architectural vulnerability factor (AVF) estimator configured to:
sum values from each global counter that is associated with a cache line in a memory section;
determine memory access event ratios based on the summations to obtain AVF estimation for the memory section, the estimated AVF proportional to a soft error rate of the memory section; and
determine the soft error rate of the memory section based on the estimated AVF; and
memory storage circuitry configured to store information from the memory section in a type of memory based on the soft error rate.

12. The system of claim 11, wherein the memory access events are read accesses and write accesses and wherein the memory access event ratios are at least one of read-to-total access ratios, write-to-total access ratios, and read-to-write access ratios.

13. The system of claim 11, wherein the local counter is on-chip and local to a processor and the global counter is off-chip.

14. The system of claim 13, wherein a number of local counters on-chip are less than a number of global counters.

15. The system of claim 13, wherein the predetermined occurrence is at least one of counter saturation, counter eviction and periodic update.

16. The system of claim 11, wherein:
for each cache line, the local counter has an x bit counter and the global counter has a y bit counter; and
x is less than y, and x and y are selected to optimize update frequency between the local counter and the global counter.

17. A method for metric determination, the method comprising:
counting events occurring at an event generator with a local counter;
updating a global counter with a value from the local counter when a predetermined occurrence occurs at the local counter;
determining at least one metric based on the value in the global counter regarding the events, the metric proportional to a soft error rate of a memory section;
determining the soft error rate of the memory section based on the metric; and
storing information from the memory section in a type of memory based on the soft error rate.

18. The method of claim 17, wherein the events are memory read accesses and memory write accesses which occur at a cache line associated with the local counter and the at least one metric is at least one of read-to-total access ratios, write-to-total access ratios and read-to-write access ratios.

19. The method of claim 17, wherein a local counter is on-chip and local to a processor and a global counter is off-chip and wherein a number of local counters on-chip are less than a number of global counters.

20. The method of claim 17, wherein a number of local counters on-chip are less than a number of global counters.

* * * * *